United States Patent
Nagashima et al.

(12)

(10) Patent No.: US 9,587,124 B2
(45) Date of Patent: Mar. 7, 2017

(54) AQUEOUS INK FOR INKJET, INKJET RECORDING METHOD, INKJET RECORDED MATTER, AND INKJET RECORDING DEVICE

(71) Applicants: Hidefumi Nagashima, Kanagawa (JP);
Naohiro Toda, Kanagawa (JP);
Tomohiro Nakagawa, Kanagawa (JP);
Juichi Furukawa, Kanagawa (JP);
Ichiroh Fujii, Kanagawa (JP)

(72) Inventors: Hidefumi Nagashima, Kanagawa (JP);
Naohiro Toda, Kanagawa (JP);
Tomohiro Nakagawa, Kanagawa (JP);
Juichi Furukawa, Kanagawa (JP);
Ichiroh Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/589,131

(22) Filed: Jan. 5, 2015

(65) Prior Publication Data

US 2015/0191614 A1 Jul. 9, 2015

(51) Int. Cl.
| | | |
|---|---|---|
| C09D 11/322 | (2014.01) | |
| C09D 11/033 | (2014.01) | |
| C09D 11/106 | (2014.01) | |
| C09D 11/102 | (2014.01) | |

(52) U.S. Cl.
CPC .......... *C09D 11/106* (2013.01); *C09D 11/102* (2013.01); *C09D 11/322* (2013.01); *Y10T 428/24901* (2015.01)

(58) Field of Classification Search
None
See application file for complete search history.

(56) References Cited

U.S. PATENT DOCUMENTS

| | | | | |
|---|---|---|---|---|
| 7,307,110 B2* | 12/2007 | Yatake | ................... | B82Y 30/00 523/160 |
| 2002/0148387 A1* | 10/2002 | An | ......................... | C09D 11/18 106/31.68 |
| 2004/0077747 A1* | 4/2004 | Payne | ..................... | A01N 25/10 523/122 |
| 2005/0074601 A1* | 4/2005 | Onishi | ................... | B32B 27/08 428/332 |
| 2005/0176847 A1* | 8/2005 | Cagle | .................... | C09D 11/30 523/160 |

(Continued)

FOREIGN PATENT DOCUMENTS

| | | |
|---|---|---|
| JP | 2000-007967 | 1/2000 |
| JP | 2005-220352 | 8/2005 |

(Continued)

OTHER PUBLICATIONS

U.S. Appl. No. 14/297,868, filed Jun. 6, 2014.
U.S. Appl. No. 14/320,859, filed Jul. 1, 2014.

*Primary Examiner* — Peter A Salamon
(74) *Attorney, Agent, or Firm* — Cooper & Dunham LLP (57) ABSTRACT

An aqueous ink for inkjet includes water, at least one hydrosoluble organic solvent each having a boiling point of 250° C. or lower; vinyl polymer particles containing a pigment, and polycarbonate-based urethane resin particles, wherein the aqueous ink for inkjet is used for an inkjet recording system including a heating step.

10 Claims, 2 Drawing Sheets

(56) References Cited

U.S. PATENT DOCUMENTS

| | | | |
|---|---|---|---|
| 2005/0228069 A1* | 10/2005 | Kataoka | C09C 3/10 523/160 |
| 2010/0093119 A1* | 4/2010 | Shimizu | B41N 1/12 438/29 |
| 2014/0192112 A1 | 7/2014 | Nagashima et al. | |
| 2014/0267520 A1* | 9/2014 | Toda | B41J 11/002 347/102 |
| 2015/0191614 A1* | 7/2015 | Nagashima | C09D 11/322 428/207 |

FOREIGN PATENT DOCUMENTS

| | | |
|---|---|---|
| JP | 2006-282760 | 10/2006 |
| JP | 2009-132766 | 6/2009 |
| JP | 2011-094082 | 5/2011 |
| JP | 2013-076018 | 4/2013 |
| JP | 2013-194150 | 9/2013 |
| WO | WO99/67337 A1 | 12/1999 |

\* cited by examiner

AQUEOUS INK FOR INKJET, INKJET RECORDING METHOD, INKJET RECORDED MATTER, AND INKJET RECORDING DEVICE

CROSS-REFERENCE TO RELATED APPLICATIONS

This patent application is based on and claims priority pursuant to 35 U.S.C. §119(a) to Japanese Patent Application Nos. 2014-002501 and 2014-104438, filed on Jan. 9, 2014 and May 20, 2014, respectively, in the Japan Patent Office, the entire disclosures of which are hereby incorporated by reference herein.

BACKGROUND

Technical Field

The present invention relates to an aqueous ink for inkjet, an inkjet recording method, inkjet recorded matter, and an inkjet recording device.

Background Art

Inkjet technologies have been appealing in business field of, for example, display, posters, and signboards.

In such industrial use, since porous recording media have problems with regard to light fastness, water resistance, and abrasion resistance, non-porous recording media such as plastic film are used. Accordingly, ink for such non-porous recording medium has been developed.

In this context, development of inkjet technology is in progress to use aqueous ink widely used at home so far, which is less burden on environment, for industrial use.

SUMMARY

The present invention provides an improved aqueous ink for inkjet including water, at least one hydrosoluble organic solvent each having a boiling point of 250° C. or lower; vinyl polymer particles containing a pigment, and polycarbonate-based urethane resin particles, wherein the aqueous ink for inkjet is used for an inkjet recording system including a heating step.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

As a result of an investigation made by the present inventors, it was found that when an aqueous ink for inkjet containing water, one or more particular hydrosoluble organic solvent, vinyl polymer particles containing a pigment, and polycarbonate-based resin particles is used, drying property and high gloss, scratch resistance, ethanol resistance, and light fastness at image portions are improved even when images are printed on a non-porous substrate Thus, the present invention was made.

That is, the present invention is an aqueous ink for inkjet containing water; one or more hydrosoluble organic solvents each having a boiling point of 250° C. or lower; vinyl polymer particles containing a pigment, and polycarbonate-based urethane resin particles.

Also, the aqueous ink for inkjet is used in an inkjet recording system including a heating process.

The aqueous ink for inkjet of the present disclosure is used for an inkjet recording system including a heating process and contains water and contains one or more hydrosoluble organic solvents each having a boiling point of 250° C. or lower, vinyl polymer particles containing a pigment, and polycarbonate-based urethane resin particles.

The aqueous ink for inkjet, the inkjet recording method, the inkjet recorded matter, the inkjet recording device related to the present disclosure are described below.

It is to be noted that although the embodiments described below are preferred embodiments described with various technically preferred limitations, and the present invention is not limited thereto unless otherwise described.

Since hydrosoluble organic solvents added to an aqueous ink generally has a higher boiling point than water and is not easily dried, an organic solvent having a relatively low boiling point is added to obtain drying properties. However, quick drying property is not obtained in general without compromising the uniformity of a formed resin film, thereby degrading film fastness and gloss.

As a result of a continuous investigation about the relation between an existing resin and a hydrosoluble organic solvent, the present inventors have found that a uniform layer can be formed by using a polycarbonate-based urethane resin and a particular hydrosoluble organic solvent.

In particular, such a polycarbonate-based urethane resin has excellent water resistance, heat resistance, abrasion resistance, and weathering properties due to strong agglomeration force of a carbonate group and is suitable for printed matter used in a severe environment such as outdoor. Accordingly, after a particular hydrosoluble organic solvent is applied as ink together with polycarbonate-based urethane resin emulsion particles, a uniform layer can be formed by moderate drying and acceleration of adhesion of resin emulsion particles, so that high level of gloss is achieved at image portions. Furthermore, scratch resistance and ethanol resistance are demonstrated. In addition, when no hydrosoluble organic solvent having a boiling point higher than 250° C. is contained, drying properties are ameliorated.

In addition, in the case of outdoor use (typically advertisement and signboard), white ink is applied to the entire surface of a transparent plastic film, etc., to improve visibility. In such a case, conventionally, image fastness, for example, scratch resistance, is not sufficient after application of white ink. To the contrary, the ink of the present disclosure demonstrates strong image fastness even when white ink is applied or used to form a layer.

In the present disclosure, ink containing the white pigment described later is referred to as white ink.

The other compositions of the ink of the present disclosure are described next. The ink compositions of the present disclosure contains at least water, a hydrosoluble organic solvent, vinyl polymer particles containing a pigment, and polycarbonate-based urethane resin particles, and optionally contains a surfactant, an anti-septic and anti-fungus agent, a corrosion inhibitor, and a pH regulator.

Polycarbonate-Based Urethane Resin Particles

Polycarbonate-based urethane resin particles for use in the present disclosure are described below. The polycarbonate-based urethane resin in the present disclosure is obtained by reaction conducted between polycarbonate polyol and polyisocyanate.

It is possible to use as the polycarbonate polyol mentioned above polyols prepared by, for example, ester exchange reaction of a carboxylic acid ester and a polyol under the presence of a catalyst or reaction between phosgene and bisphenol A.

Specific examples of carboxylic acid esters include, but are not limited to, methyl carbonate, dimethyl carbonate, ethyl carbonate, diethyl carbonate, cyclocarbonate, and diphenyl carbonate.

Specific examples of the polyol mentioned above to react with the carboxylic acid ester include, but are not limited, low-molecular weight diol compounds such as ethylene glycol, diethylene glycol, 1,2,-propylene glycol, dipropylene glycol, 1,4-butane diol, 1,5-pentane diol, 3-methyl-1,5-pentane diol, neopentyl glycol, and 1,4-cyclohexane diol; polyethylene glycol, and polypropylene glycol.

There is no specific limit to the polyisocyanate mentioned above. Specific examples thereof include, but are not limited to, aromatic polyisocyante compounds such as 1,3-phenylene diisocyanate, 1,4-phenylene diisocyanate, 2,4-tolylene diisocyanate (TDI), 2,6-tolylene diisocyanate, 4,4'-diphenylene methane diisocyanate (MDI), 2,4-diphenyl methane diisocyanate, 4,4'-diisocynato biphenyl, 3,3'-dimethyl-4,4'-diisocyanate biphenyl, 3,3'-dimethyl-4,4'-diisocyanate, diphenyl methane, 1,5-naphtylene diisocyanate, m-isocyanate pheny sulphonyl isocyanate, p-isocyanate phenyl sulfonyl isocyanate, and p-isocyanate phenyl sulfonyl isocyante; aliphatic polyisocyanates compounds such as ethylene diisocyanate, tetramethylene diisocyanate, hexamethylene diisocyanate (HDI), dodecamethylene diisocyanate, 1,6,11-undecane triisocyanate, 2,2,4-trimethyl hexamethylene diisocyanate, lysine diisocyanate, 2,6-diisocyante methylcaproate, bis(2-isocyanate ethyl)fumarate, bis(2-isocyanateethyl)carbonate, and 2-isocyanate ethyl-2,6-diisocyanate hexanoate; and alicyclic polycyanate compounds such as isophorone diisocyante (IPDI), 4,4'dicyclohexyl methane diisocyanate (hydrogenated MDI), cyclohexylene diisocyante, methylcyclohexylene diisocyanate (hydrogenated TDI), bis(2-isocyanateethyl)-4-dichlorohexene-1,2-dicarboxylate, 2,5-norbornane diisocyanate, and 2,6-norbonane diisocyante. These can be used alone or in combination.

The ink of the present disclosure is expected to be use for the purpose of outdoor use, typically posters and signboards, so that an applied layer keeping an extremely high level of weathering property is demanded. In terms of this, using aliphatic or alicyclic diisocyanates is preferable. Furthermore, in the present disclosure, it is preferable to add at least one kind of alicyclic diisocyanate, thereby easily acquiring a desired layer strength.

Of these, in particular, isophrone diisocyanate and dicyclohexyl methane diisocyanate are preferable. The ratio of alicyclic diisocyanate is preferably 60% by weight or more in all the isocyanate compounds.

In the present disclosure, it is preferable to add polycarbonate-based urethane resin particles in a resin emulsion form in which polycarbonate-based urethane resin particles are dispersed in an aqueous medium. The ratio of the solids content in the resin emulsion is preferably 20% by weight or more. The solids content being 20 by weight or more is preferable in terms of designing of prescription of ink. For example, freedom of change and adjustment of the addition amount and ratio of each ink composition material can be improved.

The urethane resin particles preferably has a volume average particle diameter of from 10 nm to 350 nm in light of liquid storage stability and discharging stability when ink is prepared.

In addition, when dispersing urethane resin particles in an aqueous medium, it is possible to use a forcible emulsification type using a dispersant. However, since such a dispersant tends to remain in a layer (film), thereby weakening the strength of the layer, a so-called self-emulsification type, which has anionic property in its molecule structure, is preferably used. As for the acid value, containing an anionic group within an acid value range of from 20 mgKOH to 100 mgKOH/g is preferable to impart excellent scratch resistance and chemical resistance.

In addition, specific examples of the anionic group include, but are not limited to, a carboxyl group, a carboxylate group, a sulfonic acid group, and a sulfonate group. Of these, it is preferable to entirely or partially use a neutralized carboxylate group or sulfonate group to maintain good water dispersion stability.

Specific examples of the basic compound usable to neutralize the anionic group include, but are not limited to, organic amines such as ammonium, triethyl amine, pyridine, and morpholine, alkanol amines such as monoethanol amine, and metal salt compounds containing Na, K, Li, Ca, etc.

When using a forcible emulsification method, a nonion surfactant or anion surfactant can be used. Of the two, a nonion surfactant is preferable in terms of water resistance.

Specific examples of the nonion surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene curable ricinus, polyoxyalkylene polycyclic phenyl ether, polyoxyethylene alkyl amine, alkyl alkanol amide, and polyalkylene glycol (meth)acrylate. Of these, polyoxyethylene alkyl ether, polyoxyethylene aliphatic acid esters, polyoxyethylene sorbitan aliphatic acid ester, and polyoxyethylene alkyl amine are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. Polyoxyethylene alkyl ether sulfuric acid salts and sulfosuccinic salts are preferable.

The addition amount of a surfactant is from 0.1% by weight to 30% by weight and preferably from 5% by weight to 20% by weight to the amount of urethane resin. Within the range of from 0.1% by weight to 30% by weight, since the layer forming property of a urethane resin emulsion is not inhibited, an ink having excellent attachability and water resistance is obtained. Also, when printed matter is overlapped or rolled up, blocking, i.e., strike-through of ink, never or little occurs, which is preferable.

Moreover, the urethane resin emulsion for use in ink of the present disclosure can optionally contains a hydrosoluble organic solvent, an antiseptic agent, a leveling agent, an antioxidant, a light stabilizer, and an ultraviolet absorbent.

The method of manufacturing polycarbonate-based urethane resin particles for use in the present disclosure is described below. The method of manufacturing polycarbonate-based urethane resin particles can be any of conventional methods including the following method.

First, under the presence of no solvent or an organic solvent, a urethane prepolymer having an isocyanate group at its end is prepared by reacting a polycarbonate polyol and a polyisocyanate with an equivalent ratio in which an isocyanate group is excessive.

Next, optionally the anionic groups in the urethane prepolymer having an isocyanate group at its end is neutralized by a neutralizer. Thereafter, subsequent to reaction with a chain elongating agent, the organic solvent in the system is removed to obtain polycarbonate-based urethane resin particles.

Specific examples of usable organic solvents include, but are not limited to, ketone such as aetone and methyl ethyl ketone; ethers such as tetrahydrofuran and dioxane, acetic acid esters such as ethyl acetate and butylacetate, nitriles such as acetonitrile, and amides such as dimethyl formamide, N-methyl pyrrolidone, and 1-ethyl-2-pyrrolidone. These can be used alone or in combination.

Polyamines or other compounds having active hydrogen atom are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isophorone diamine, 4,4'-dicyclohexyl methane diamine, 1,4-cyclohexane diamine, polyamines such as diethylene triamine, dipropylene triamine, and triethylene tetramine, hydrazines such as hydrazine, N,N'-dimethyl hydrazine, and 1,6-hexamethylene bis hydrazine; dihydrazides such as succinic acid dihydrazide, adipic acid dihydrazide, glutaric acid dihydrazide, sebacic acid dihydrazide, and isophthalic acid dihydrazide.

Specific examples of the other active hydrogen containing compounds include, but are not limited to, glycols such as ethylene glycol, diethylene glycol, triethylene glycol, propylene glycol, 1,3-propane diol, 1,3-butane diol, 1,4-butane diol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinoe, and water. These can be used alone or in combination to the degree that the storage stability of a coating agent is not degraded.

It is suitable to heat the ink of the present disclosure to reduce the remaining amount of the ink of the present disclosure, improve the attachability of the ink. Also the polycarbonate-based urethane resin particles has good heat resistance.

It is not always necessary that the lowest layer forming temperature of the polycarbonate-based urethane resin particles for use in the present disclosure is room temperature or lower. However, when being heated, it is preferable that the lowest layer forming temperature is not higher than the heating temperature.

The lowest layer forming temperature is preferably from 0° C. to a temperature at least 5° C. lower than the heating temperature and more preferably from 25° C. to a temperature at least 10° C. lower than the heating temperature.

In general, lower values of the lowest layer forming temperature mean better layer forming property. However, when the lowest layer forming temperature is too low, the glass transition temperature of the resin also becomes lower so that the strength of a formed layer is insufficient.

The lowest layer forming temperature is the lowest of the temperatures below which transparent continuous film is not formed when a polycarbonate-based urethane resin emulsion is extended and thinly flown on a metal plate made of aluminum, etc. while raising the temperature. At temperatures lower than the lowest layer forming temperature, the polycarbonate-based urethane resin emulsion is liquid or white powder.

The polycarbonate-based urethane resin for use in the present disclosure preferably has a surface hardness of 100 N/mm$^2$ or greater. In this range, the ink of the present disclosure forms a strong layer, which leads to improvement of scratch resistance.

The surface hardness in the present disclosure is measured by the following method: After applying a polycarbonate-based urethane resin emulsion to a glass slide to form a layer having a thickness of 10 μm, the resin emulsion is dried at 100° C. for 30 minutes to form a resin layer. Using a micro surface hardness tester (FISCHERSCOPE HM2000, manufactured by Fischer Instruments K.K. Japan), the pressed-in depth when a Berkovich indenter is pressed in under a load of 9.8 mN is obtained, which is measured as Martens hardness described in ISO14577-2002.

The addition amount of the polycarbonate-based urethane resin particles in the ink of the present disclosure is preferably from 0.5% by weight to 10% by weight, more preferably from 1% by weight to 8% by weight, and furthermore preferably from 3% by weight to 8% by weight in solids content conversion in the ink. When the addition amount is 0.5% by weight or more, since a sufficient layer is formed against a pigment, image fastness is improved. When the addition amount is 10% by weight or less, desired viscosity is obtained, which leads to stable ejection. Additionally, within the range, drying property is improved.

The ink of the present disclosure optionally contains a resin other than polycarbonate-based urethane resin particles. However, a polycarbonate-based urethane resin preferably accounts for 50% by weight or more and more preferably 70% by weight or more in the total amount of the resin added to the ink.

Specific examples of the optional resin particles include, but are not limited to, acrylic resin particles, polyolefin resin particles, vinyl acetate resin particles, vinyl chloride resin particles, fluorine-containing resin particles, polyether resin particles, and polyester resin particles.

Pigment

Next, the pigment for use in the present disclosure is described. In the present disclosure, ink for recording containing each pigment of cyan, magenta, yellow, black, white, etc. can be used. In the present disclosure, the ink contains vinyl polymer particles containing a pigment.

Incidentally, "containing a pigment" means either or both of a state in which a pigment is encapsulated in a polymer particulate and a state in which a pigment is adsorbed to the surface of polymer particulates. In this case, all of the pigment mixed in the ink is not necessarily encapsulated in or adsorbed to the polymer particulates and some of the colorant is possibly dispersed in the emulsion unless they have an adverse impact. The pigment can be any pigment insoluble or little soluble in water that can be adsorbed by the polymer and selected without any limitation.

Incidentally, "insoluble or little soluble in water" means that the dissolved amount of a coloring material to 100 parts by weight of water at 25° C. is 10 parts by weight or less, preferably 5 parts by weight or less, and more preferably 1 part by weight or less. Also, "dissolved" means that separation or sedimentation of a coloring material is not visually confirmed at the surface or the bottom of the aqueous solution.

The polymer for use in polymer particles contained in the pigment is preferably insoluble in water and a vinyl polymer insoluble in water is preferable. Specific examples thereof include, but are not limited to, polymers formed of structure units derived from an acrylate having an aryl alkyl group or an aryl group. Other suitable structure units derive from monomers containing salt producing groups, styrene-based macromers, hydrophobic monomers, (meth)acrylonitrile, monomers having aromatic ring other than styrene, silicone-based macromers having a polymerizable group at one end, and alkylmethacrylate-based macromers. In addition, it is possible to contain a hydroxy group, and a structure unit derived from a (meth)acrylate having an alkyl group having 1 to 22 carbon atoms and preferably 1 to 18 carbon atoms.

Specific examples of the styrene-based macromer include, but are not limited to, AS-6, AS-6S, AN-6, AN-6S, HS-6S, and HS-6 (all manufactured by TOAGOSEI CO., LTD.)

It is preferable that the vinyl polymer mentioned above contains at least one kind selected from the groups formed of structure units derived from at least one of an acrylate having an arylalkyl group, an acrylate having an aryl group, a styrene-based macromer, or an alkyl methacrylate-based macromer.

The volume average particle diameter of the polymer particulates (colored particles) containing the pigment mentioned above is preferably from 0.01 μm to 0.16 μm in the ink. Within the range of 0.01 μm to 0.16 μm, an ink is obtained which has excellent ejection stability, image quality, and image fastness.

As the color of the pigment, specific examples thereof include, but are not limited to, black, colors, and white forming the background for transparent film.

These can be used alone or in combination. The ink of the present disclosure is suitably used as the white pigment.

Example of black are carbon blacks manufactured by a known manufacturing method such as channel method, an oil furnace method, a furnaces method, an acetylene black method, and a thermal black method.

Specific examples of the pigments for the colors include, but are not limited to, C. I. Pigment Yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, 153, and 155.

Specific examples of the pigments for magenta color include, but are not limited to, C. I. Pigment Red 1, 2, 3, 5, 17, 22 (brilliant fast scarlet), 23, 31, 38, 48.2 [permanent red 2B(Ba)], 48:2 [Permanent Red 2B (Ca)], 48:3 [Permanent Red 2B(Sr)], 48:4 [Permanent Red 2B(Mn)], 49:1, 52:2, 53:1, 57:1 (Brilliant Carmine 6B), 60:1, 63:1, 63:2, 64:1, 81 (Rhodamine 6G Lake), 83, 88, 92, 101 (rouge), 104, 105, 106, 108 (cadmium red), 112, 114, 122 (dimethylquinacridone), 123, 146, 149, 166, 168, 170, 172, 177, 178, 179, 185, 190, 193, 209, and 219.

Specific examples of the cyan pigments include, but are not limited to, C. I. Pigment Blue 1, 2, 15 (copper phthalocyanine blue R), 15:1, 15:2, 15:3 (phthalocyanine blue G), 15:4, 15:6 (phthalocyanine blue E), 16, 17:1, 22, 56, 60, and 63.

Specific examples of white include, but are not limited to, inorganic pigments such as titanium oxide, silicon oxide, zinc oxide, and barium sulfide. Of these, titanium oxide is particularly preferable. Also, materials having a surface treated with hydroxide, oxide, or phosphate of metal elements such as Al, Si, and Zr are preferable.

Specific examples of intermediate color include, but are not limited to, C. I. Pigment Red 177, 194, and 224, C. I. Pigment Orange 43, C. I. Pigment Violet 3, 19, 23, and 37, and C. I. Pigment Green 7 and 36.

In addition, the addition amount of a pigment serving as coloring material in an ink composition preferably ranges from about 0.1% by weight to about 10% by weight and more preferably from about 1% by weight to about 10% by weight Within this range, high image density is obtained, the image quality is improved, and good fixability and ejection stability are obtained, so that clogging, etc. can be suppressed. In addition, if a pigment is contained in a polymer particle, it is preferable that the mass (the total solids content) of the pigment and the polymer particle preferably satisfies the range specified above.

Hydrosoluble Organic Solvent

Next, the hydrosoluble organic solvent for use in the present disclosure is described.

Specific examples of the hydrosoluble organic solvents for use in the present disclosure include, but are not limited to, polyols such as ethylene glycol, diethylene glycol, 1,2-propane diol, 1,3-propane diol, 1,2-butane diol, 1,3-butane diol, 2,3-butane diol, 3-methyl-1,3-butane diol, triethylene glycol, polyethylene glycol, polypropylene glycol, dipropylene glycol, tripropylene glycol, polypropylene glycol, 1,5-pentane diol, 1,6-hexane diol, glycerin, 1,2,6-hexane triol, 2-ethyl-1,3-hexane diol, ethyl-1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate. These have to have boiling points of 250° C. or lower.

The one of more of the hydrosoluble organic solvents contained in the ink of the present disclosure has a boiling point of 250° C. or lower and preferably lower than 220° C.

Good drying property and high level of gloss are obtained by containing no hydrosoluble organic solvent having a boiling point higher than 250° C.

Of these, it is preferable to contain at least one compound selected from the group consisting of 1,2-propane diol, 1,3-propane diol, 1,2-butane diol, 1,3-butane diol, and 2,3-butane diol. Such hydrosoluble organic solvents have good compatibility with polycarbonate-based urethane resins, so that ink having more excellent layer forming property and a high level of gloss is easily obtained.

The total amount of the hydrosoluble organic solvent in ink is preferably from 20% by weight to 70% by weight and more preferably from 30% by weight to 60% by weight.

When the total amount ranges from 20% by weight to 70% by weight, ink is not easily dried and can suitably maintain viscosity. As a result, it is possible to obtain an ink having excellent ejection stability without excessive drying or viscosity increase.

Water

Water for use in the present disclosure has no specific limit. Specific examples thereof include, but are not limited to, deionized water, ultrafiltered water, Mill Q water, distilled water, and ultra pure water. The amount of water in the ink for inkjet recording has no specific limit and can be selected to a particular application.

Ultraviolet Absorber

Next, the ultraviolet absorber for use in the present disclosure is described. Such an ultraviolet absorber is added to improve image fatness and in particular light fastness. There is no specific limit to the ultraviolet absorber and specific examples thereof include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers, oxalic acid anilide-based ultraviolet absorbents, and triazine-based ultraviolet absorbers. Specific compounds are as follows.

Specific examples of the benzophenone-based ultraviolet absorbers include, but are not limited to, 2-hydroxy-4-n-octoxybenzophenone, 2-hydroxy-4-n-dodecyloxy benzophenone, 2,4-dihydroxy benzophenone, 2-hydroxy-4-methoxybenzophenone, and 2,2',4,4'-tetrahydroxy benzophenone.

Specific examples of the benzotriazole-based ultraviolet absorbers include, but are not limited to, 2-(2'-hydroxy-5'-tert-octylphenyl)benzo triazole, 2-(2'-hydroxy-5'-methylphenyl)benzo triazole, 2-(2'-hydroxy-4'-octoxyphenyl) benzo triazole, and 2-(2'-hydroxy-3'-tert-butyl-5'-methylphenyl)-5-chlorobenzo triazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3, 3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis (octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

The triadine-based ultraviolet absorbers are available on market. Specific examples thereof include, but are not limited to, TINUVIN 400-DW, TINUVIN 477-DW, and TINUVIN 479-DW (all manufactured by BASF).

These can be used alone or in combination.

The content of the ultraviolet absorber is preferably from 0.5% by weight to 20% by weight and more preferably from 1% by weight to 15% by weight as the effective component in ink. When the content is 0.5% by weight or more, the functionality of the absorber is sufficiently demonstrated. In addition, if the content is 20% by weight or less, no crystal of an ink precipitates around nozzles when the ink is dried.

Surfactant

As for the ink of the present disclosure, a surfactant can be added so as to secure the wettability of the ink to a recording medium. The addition amount of a surfactant is preferably from 0.1% by weight to 5% by weight as the effective component in ink. When the addition amount is 0.1% by weight or more, the wettability of an ink to a non-porous substrate is secured, thereby improving the image quality. When the addition amount is 5% by weight or less, ink tends not to foam so that excellent ejection stability is achieved.

Within this range, the surfactant can be any surfactant with no limitation.

The surfactant can be any of an amphoteric surfactant, a nonionic surfactant, and an anionic surfactant. Considering the relation between the dispersion stability of a coloring material and the image quality, nonionic surfactants are preferable, which include polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic acid esters, polyoxyethylene sorbitan aliphatic acid esters, and adducts of acetylene alcohol with ethylene oxides, etc. In addition, it is possible to add a fluorine-containing surfactant and/or silicone-based surfactant depending on prescription.

Other Additives

Examples of other additives include, preservatives and fungicides, corrosion inhibitors, and pH regulators.

Specific examples of preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors, but are not limited to, acid sulfite, thiosodium sulfate, ammonium thiodiglycolate, diisopropyl ammonium nitrite, pentaerythritol quaternary nitride, and dicyclohexyl ammonium nitrite.

The pH regulator can be any material that can adjust pH to a desired value without an adverse impact on an ink to be prescribed. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure is manufactured by dissolving the ink components mentioned above in an aqueous medium followed by optional mixing and stirring. Typically, a stirrer using a stirring wing, a magnetic stirrer, a high performance disperser etc., can be used for mixing and stirring but the method of manufacturing ink does not affect the present disclosure.

The ink of the present disclosure can produce images having excellent gloss and image fastness on a non-porous substrate. The non-porous substrate can be in particular plastic film such as polyvinyl chloride resin film, polyethylene terephthalate (PET) film, and polycarbonate film. Also, the ink of the present disclosure is suitable for other non-porous substrates and conventionally used porous media such as plain paper or inorganic coated porous media.

The ink of the present disclosure can be used to print high quality images on non-porous media. However, it is more preferable to heat a recording medium in terms of forming an image with higher quality, abrasion resistance, and attachability and demonstration of high performance under high speed performance printing conditions.

The heating temperature can be changed depending on the kind and amount of a hydrosoluble organic solvent contained in ink and the lowest layer forming temperature of an added resin. It also can be changed depending on the kind of a recording medium to be printed. The heating temperature is preferably high in terms of drying property and layer forming temperature. However, if the heating temperature is too high, a recording medium on which an image is printed is damaged or an ink head is also heated unnecessarily, thereby causing non-ejection of ink. This is not preferable. The heating temperature is preferably from 40° C. to 120° C. and more preferably from 60° C. to 90° C.

Inkjet Recording Device

The inkjet recording device of the present disclosure includes at least a printing device to print an image on a recording medium and a heating device to heat the recorded matter. Moreover, the image recording device optionally has an ink ejection device to eject an aqueous ink for inkjet to form an image by applying an energy thereto and a transfer device to transfer a non-porous substrate including plastic film such as vinyl chloride resin film, PET film, and polycarbonate film, and other recording media.

The ink ejection device ejects the aqueous ink of the present disclosure to form an image by applying a stimulus to the ink. The ink ejection device has no specific limit and can be selected to a particular application. For example, various recording heads (ink ejection head) are usable. In particular, an ink ejection device is preferable which has a head having multiple nozzle arrays and a sub-tank that accommodates an ink supplied from a liquid storing tank and supplies the liquid to the head.

It is preferable that the sub-tank mentioned above has a negative pressure producing device to produce a negative pressure in the sub-tank, an air releasing device to release air in the sub-tank, and a detector to detect whether there is ink therein by the difference of electric resistances.

The stimulus mentioned above has no specific limit and can be selected to a particular application. For example, heat (temperature), pressure, vibration, and light can be suitably used as the stimulus. These can be used alone or in combination. Among these, heat and pressure are preferable.

Examples of the device to generate such a stimulus include a heater, a pressurization device, a piezoelectric element, a vibrator, an ultrasonic oscillator, light, etc. Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

How the ink is ejected has no specific limit and can be selected depending on the kind of stimuli mentioned above. For example, in a case in which "heat" is applied as a stimulus, a method can be used which includes applying thermal energy according to recording signals to ink in a recording head by, for example, a thermal head to generate foams in the ink, thereby ejecting and spraying the ink as droplets from the nozzles of the recording head due to the pressure of the foam.

In addition, in a case in which the stimulus is "pressure", for example, a method can be used in which ink is ejected and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room. By these, a mechanical energy can be applied to ink.

In the present disclosure, it is preferable to eject ink by applying a voltage to a piezoelectric element.

No heat is generated by the piezoelectric system, which is advantageous to eject ink containing a resin. This is particularly suitable to subdue clogging in nozzles when ink containing a small amount of wetting agent is used.

In addition, to prevent non-ejection of ink caused by clogging of nozzles, it is preferable to conduct false scanning by applying to a piezoelectric element a voltage above which ink is ejected. Furthermore, before false scanning reaching an amount corresponding to one page printing, it is preferable to operate ejection of ink to an ink storing portion.

In addition, it is preferable to include a scraper to scrape ink fixated on a receiver of false ejection. Using a wiper or a cutter is preferable as the scraper.

In addition, the inkjet recording device of the present disclosure optionally includes a transfer device to transfer a recording medium. As the transfer device, known transfer devices such as a transfer roller and a transfer belt are suitable.

In addition, the inkjet recording device of the present disclosure optionally includes a heating device to fix ink droplets on a recording medium such as a non-porous substrate.

As the heating device (heater), one or more known heating devices can be selected.

As the heating device, for example, devices for a forced-air heating, radiation heating, conductive heating, high frequency drying, or microwave drying are usable. These can be used alone or in combination.

An embodiment of the inkjet recording device of the present disclosure is described in detail with reference to the drawings. In the description, non-porous substrates are used but the present disclosure is not limited thereto.

Figure 1:
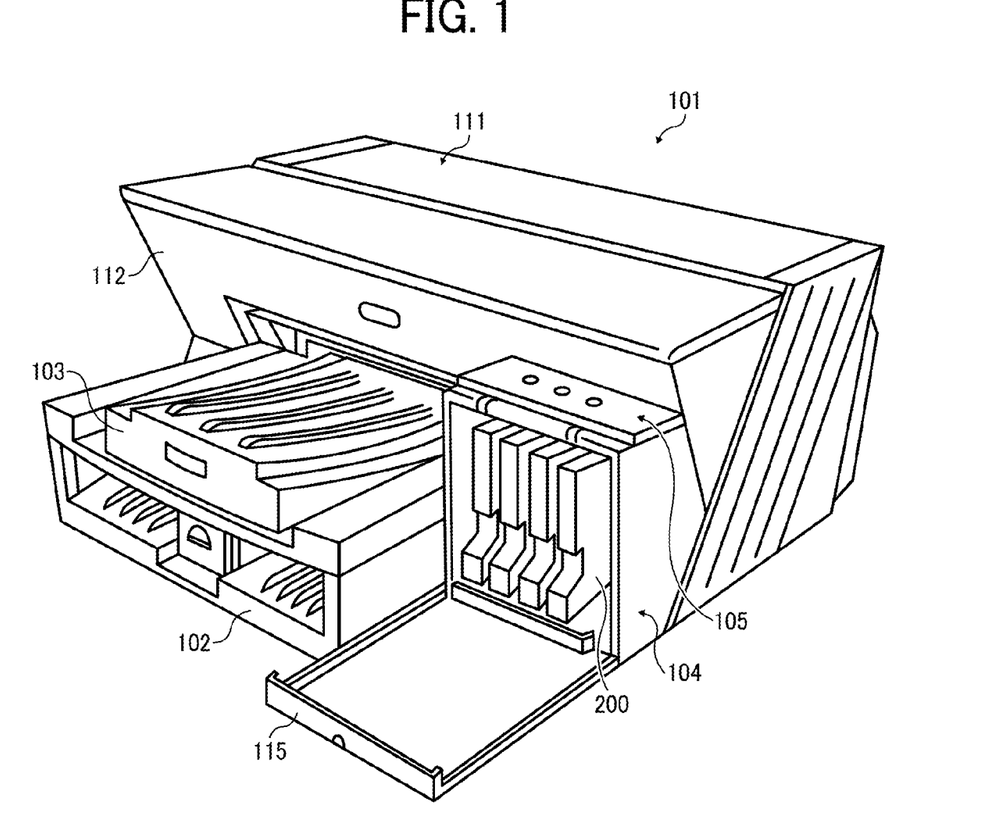
FIG. 1 is a schematic diagram illustrating the configuration of an embodiment of the inkjet recording device using the ink according to an embodiment of the present invention.

FIG. 1 is a schematic diagram illustrating the inkjet recording device according to an embodiment of the present disclosure.

The inkjet recording device 101 illustrated in FIG. 1 has a sheet feeder tray 102 to feed recording media placed in the inkjet recording device 101, an ejection tray 103 attached to the inkjet recording device 101, which stores the recording media (non-porous substrate) on which images are recorded (formed), and an ink cartridge installation unit 104. On the upper surface of the ink cartridge installation unit 104 is arranged an operating portion 105 including operation keys, a display, etc. The ink cartridge installation unit 104 has a front cover 115 that is openable and closable to detach and attach an ink cartridge 200. In FIG. 1, the reference numerals 111 and 112 represent an upper cover and a front face, respectively.

Figure 2:
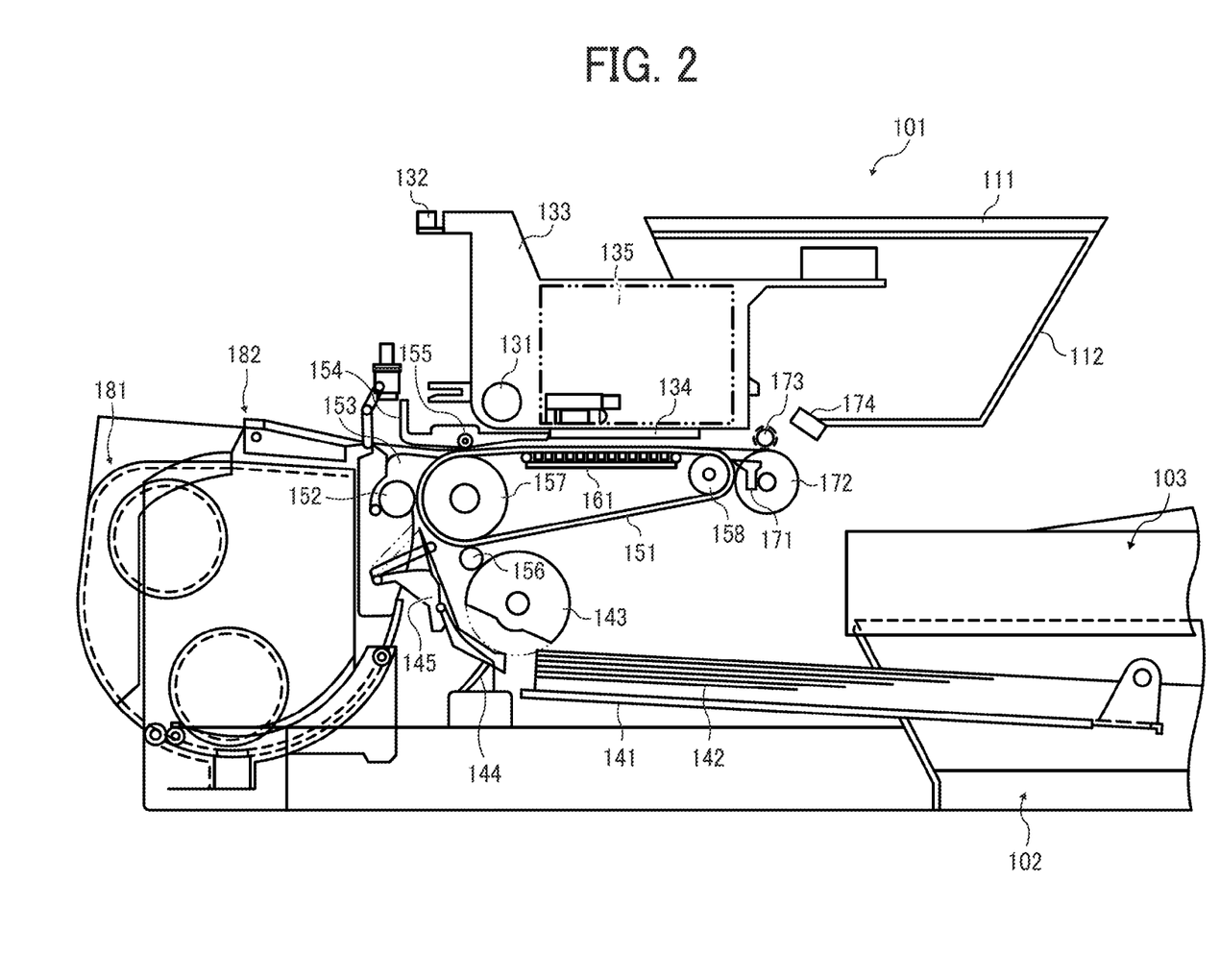
FIG. 2 is a schematic diagram illustrating the configuration of another embodiment of the inkjet recording device using the ink according to an embodiment of the present disclosure.

Inside the inkjet recording device 101, as illustrated in FIG. 2, a guide rod 131 serving as a guiding member that laterally bridges side plates provided on the right hand side and left hand side and a stay 132 hold a carriage 133 slidably movable in the main scanning direction. A main scanning motor moves the carriage 133 for scanning.

The carriage 133 has a recording head 134 having four inkjet recording heads that eject ink droplets of each color of yellow (Y), cyan (C), magenta (M), and black (Bk) while multiple ink discharging mouths are arranged in the direction crossing the main scanning direction with the ink droplet ejection direction downward.

In addition, it is an option to provide an inkjet head to eject white ink droplets to the recording head 134. In such a case, the number of the heads for inkjet recording becomes five in the recording head 134. The number of the recording heads is four in FIGS. 1 and 2 but is not limited thereto. Other optional recording heads are provided according to other color inks used in addition to the white ink.

As the heads for inkjet recording that form the recording head 134, it is possible to use a device having an energygenerating device to eject (discharge) ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 has sub tanks 135 for each color to supply each color ink to the recording head 134. The ink of ink set is supplied and replenished to the sub tank 135 from the ink cartridge 200 mounted onto the ink cartridge installation unit 104 via a tube for supplying ink.

A sheet feeding unit to feed a non-porous substrate 142 loaded on a non-porous substrate loader (pressure plate) 141 of the sheet feeder tray 102 includes a half-moon shape roller (sheet feeding roller 143) to separate and feed the non-porous substrate 142 one by one from the non-porous substrate loader 141 and a separation pad 144 that is made of a material having a large friction index and biased towards the sheet feeding roller 143.

A transfer unit to transfer the non-porous substrate 142 fed from the sheet feeding unit on the lower side of the recording head 134 has a transfer belt 151 to electrostatically adsorb and transfer the non-porous substrate 142, a counter roller 152 to transfer the non-porous substrate 142 fed from the sheet feeding unit via a guide 145 while pinching the non-porous substrate 142 with the transfer belt 151, a transfer guide 153 to make the non-porous substrate 142 trace the transfer belt 151 by changing the transfer direction of the non-porous substrate 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 has an endless form, stretched between a transfer roller 157 and a tension roller 158 and is rotatable in the belt transfer direction. This transfer belt 151 has, for example, a top layer serving as a non-porous substrate adsorption surface made of a resin material such as a copolymer (ETFE) of tetrafluoroethylene and ethylene with no resistance treatment having a thickness about 40 μm, and a bottom layer (intermediate resistance layer, earth layer) made of the same material as that for the top layer with resistance treatment with carbon. On the rear side of the transfer belt 151, a guiding member 161 is arranged corresponding to the printing area by the recording head 134.

A discharging unit to discharge the non-porous substrate 142 on which images are recorded by the recording head 134 includes a separation claw 171 to separate the non-porous substrate 142 from the transfer belt 151, a sheet-ejection roller 172, and a sheet discharging roller 173. The non-porous substrate 142 is dried by heat wind by a fun heater 174 and thereafter output to a sheet ejection tray 103 arranged below the sheet-ejection roller 172.

A duplex printing sheet feeding unit 181 is detachably attached to the rear side of the inkjet recording device 101.

The duplex printing sheet feeding unit 181 takes in and reverses the non-porous substrate 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recording device, the non-porous substrate 142 is separated and fed from the sheet feeding unit one by one substantially vertically upward, guided by the guide 145, and transferred while being pinched between the transfer belt 151 and the counter roller 152. Furthermore, the front end of the non-porous sheet 142 is guided by the transfer guide 153 and pressed against the transfer belt 151 by the front end pressure roller 155 to change the transfer direction substantially 90°.

Since the transfer belt 151 is charged by the charging roller 156 at this point in time, the non-porous substrate 142 is electrostatically adsorbed to the transfer belt 151 and transferred. By driving the recording head 134 according to the image signal while moving the carriage 133, ink droplets are discharged to the non-porous substrate 142 not in motion to record an image for an amount corresponding to one line and thereafter the non-porous substrate 142 is transferred in a predetermined amount to conduct recording for the next line.

On receiving a signal indicating that the recording has completed or the rear end of the non-porous substrate 142 has reached the image recording area, the recording operation stops and the non-porous substrate 142 is ejected to the sheet-ejection tray 103.

A serial type (shuttle type) in which the carriage scans is used in this description but this is true in a line-type inkjet recording device having a line type head.

The inkjet recording device of the present disclosure can be applied to recording systems employing inkjet recording system such as printers, facsimile machines, photocopiers, multi-functional machines (printer/facsimile/photocopier) for inkjet recording in particular.

Recorded Matter

On the recorded matter of the present disclosure, information or an image is recorded on a recording medium by using the ink of the present disclosure. The recording medium can be selected to a particular application and can be any of plain paper, gloss paper, special paper, cloth, film, transparent sheets, etc.

By the ink of the present disclosure, in particular when it is used for a non-porous substrate, images having good level of gloss and image fastness can be produced. The non-porous substrate has no specific limit and can be any of recording media, for example, a recording medium formed of a hydrophobic resin that never or little absorbs water such as vinyl chloride, polypropylene, polyethylene, and polycarbonate and a recording medium such as coated paper that absorbs water to some degree but is slow at absorption, so that an aqueous ink is not easily dried in the printing process of a typical inkjet recording at room temperature and normal humidity, which causes trouble.

Such recorded matter can be used alone or in combination. The recorded matter obtained in the present disclosure has a high degree of gloss and friction (scratch) resistance and can be used for various applications.

Inkjet Recording Method

The inkjet recording method of the present disclosure includes steps of printing an image on a recording medium by thermal or mechanical energy action on the aqueous ink for inkjet of the present disclosure obtain recorded matter and heating the recorded matter. In addition, in the printing step, it is preferable to use a non-porous substrate as the recording medium. When the ink of the present disclosure is used for a non-porous substrate, images having good level of gloss and image fastness can be produced. The same thermal energy and mechanical energy can be used as those described above.

The printing device for use in the printing step has no particular limitation and can be the ejection device described above. The heating device for use in the heating step has no particular limitation and as described above, can be devices for a forced-air heating, radiation heating, conductive heating, high frequency drying, or microwave drying. These can be used alone or in combination.

As described above, the heating temperature can be changed depending on the kind and amount of a hydrosoluble organic solvent contained in ink and the lowest layer forming temperature of an added resin. It also can be changed depending on the kind of a recording medium to be printed. The heating temperature is preferably high in terms of drying property and layer forming temperature. However, if the heating temperature is too high, a recording medium on which an image is printed is damaged or an ink head is also heated, thereby causing non-ejection of ink. This is not preferable. The heating temperature is preferably from 40° C. to 120° C. and more preferably from 60° C. to 90° C.

The inkjet recording method of the present disclosure optionally includes the steps of coating the entire surface of a recording medium with a white pigment serving as the aqueous ink for inkjet and coating the recording medium with pigments serving as aqueous ink for inkjet other than white pigments. Therefore, when an ink containing white pigments is used, it is suitable to use the following recording method. The ink for inkjet recording containing white pigments is applied to the entire surface of a recording medium and thereafter the recorded matter is heated. According to this, for example, if a transparent film is used, the white ink is attached to the entire surface of the recording medium, the recorded matter is visible. The ink of the present disclosure has good drying property, high level of gloss, and strong abrasion resistance, so that it is possible to coat the entire surface of a non-porous substrate such as transparent film with the white ink.

Moreover, on a recording medium having the surface entirely coated with the white ink, an ink having pigment other than the white pigment can be printed and the recorded matter can be heated. According to this, the ink for printing in the present disclosure can be printed on a recording medium which is coated with white ink to improve visibility. The heating temperature is within the same temperature as the heating temperature described above.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described in detail with reference to Examples and Comparative Examples. However, the present disclosure is not limited to these examples.

Preparation of Polycarbonate-Based Urethane Resin Emulsion A 1,500 g of polycarbonate diol (reaction product of 1,6-hexane diol and dimethyl carbonate), 220 g of 2,2-dimethylol propionic acid (DMPA), and 1,347 g of propylene glycol dimethyl ether (boiling point: 171° C.) were charged in a reaction container equipped with a stirrer, a reflux cooling tube, and a thermometer in a nitrogen atmosphere followed by heating to 60° C. to dissolve DMPA.

Thereafter, 1,445 g of 4,4'-dicyclohexyl methane diisocyanate and 2.6 g of dibutyl tin dilaurylate (catalyst) were added followed by heating to 90° C. to conduct urethanification reaction in five hours, thereby obtaining a urethane prepolymer having an isocyanate group at its end.

This reaction mixture was cooled down to 80° C. 149 g of triethylamine was admixed therewith. 4,340 g was extracted from the admixed mixture and added to a liquid mixture of 5,400 g of water and 15 g of triethyl amine while being vigorously stirred.

Thereafter, 1,500 g of ice and 626 g of 35% by weight 2-methyl-1,5-pentane diamine aqueous solution were added to conduct chain elongation reaction followed by distillation away of the solvent in such a manner that the solids content concentration was 30% to obtain polycarbonate-based urethane resin emulsion A (urethane resin component: 30%, water: 64%, dipropylene glycol dimethyl ether: 6%).

The thus-obtained polycarbonate-based urethane resin emulsion A was applied to a slide glass to form a layer having a thickness of 10 μm, the resin emulsion was dried at 100° C. for 30 minutes to form a resin film. Martens hardness of the film was measured by a micro surface hardness tester (FISCHERSCOPE HM2000, manufactured by Fischer Instruments K.K. Japan). It was 120 N/mm$^2$ when a Vickers indenter was pressed in under a load of 9.8 mN. The lowest layer forming temperature of the thus-obtained polycarbonate-based urethane resin emulsion A was 30° C.

Preparation of Polycarbonate-Based Urethane Resin Emulsion B

Polycarbonate-based urethane resin emulsion B (urethane resin component: 30%, water: 64%, dipropylene glycol dimethyl ether: 6%) was obtained in the same manner as in the preparation of the emulsion A except that 4,4'-dicyclohexyl methane diisocyanate was changed to hexamethylene diisocyanate. The film hardness of the polycarbonate-based urethane resin emulsion B was measured similarly and the Martens hardness thereof was 87 N/mm$^2$. The lowest layer forming temperature of the thus-obtained polycarbonate-based urethane resin emulsion B was 33° C.

Example 1

Preparation of Monoazo Yellow Pigment Containing Polymer Particulate Dispersion Element After replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer (AS-6, manufactured by TOA GOSEI CO., LTD.), and 0.4 g of mercapto ethanol were charged in the flask and the system was heated to 65° C.

A liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (AS-6, manufactured by TOA GOSEI CO., LTD.), 3.6 g of mercapto ethanol, 2.4 g of azobisdimethyl valeronitrile, and 18 g of methylethyl ketone were dripped into the flask in two and a half hours. After dripping, a liquid mixture of 0.8 g of azobis dimethyl valeronitrile and 18 g of methylethyl ketone was dripped to the flask in half an hour; After one-hour aging at 65° C., 0.8 g of azobisdimethyl valeronitrile was added followed by another one-hour aging; After the reaction was complete, 364 g of methylethyl ketone was added to the flask to obtain 800 g of a polymer solution having a concentration of 50%.

After 28 g of the thus-obtained polymer solution, 26 g of yellow pigment (C. I. Pigment Yellow 74, manufactured by Dainichiseika Color Chemicals Mfg. Co. Ltd.), 13.6 g of 1 mol/L potassium hydroxide solution, 20 g of methylethyl ketone, and 30 g of deionized water were sufficiently stirred, the mixture was mixed and kneaded using a triple roll mill.

The thus-obtained paste was charged in 200 g of deionized water. Subsequent to sufficient stirring, methylethyl ketone and water were distilled away using an evaporator to obtain a water dispersion element of hydroinsoluble vinyl polymer particles having a solids content of 20% by weight. The average particle diameter (D50) of the thus-obtained polymer particles was 76 nm as measured by a particle size distribution measuring instrument (MICROTRAC UPA-EX150, manufactured by NIKKISO CO., LTD.).

Using the liquid dispersion of polymer particles containing monoazo yellow pigment, the following recipe was mixed and stirred and thereafter filtrated by a polypropylene filter of 0.2 μm to prepare an ink.

| | |
|---|---|
| Liquid dispersion of polymer particles containing monoazo yellow pigment: | 15 parts |
| Polycarbonate-based urethane resin emulsion A: | 7.5 parts (containing 0.9 parts of dipropylene glycol dimethylether having a boiling point of 171° C.). |
| Acrylic-based Resin Emulsion: | 2 parts (VONCOAT R-3380-E, manufactured by DIC Corporation) |
| Surfactant $CH_3(CH_2)_{12}O(CH_2CH_2O)_3CH_2COOH$: | 2 parts |
| Propylene glycol (boiling point: 188° C.): | 20 parts |
| Diethylene glycol n butyl ether (boiling point: 230° C.): | 15 parts |
| Preservatives and fungicides (PROXEL LV, manufactured by AVECIA GROUP): | 0.1 parts |
| Deionized water | 38.4 parts |

Next, the thus-obtained ink was evaluated in the following manner.

The mixing ratio and the evaluation results of the ink of Example and Comparative Example are shown in Tables 1 and 2. In Tables 1 and 2, blank means "no amount".

Evaluation on Drying Property

After an inkjet printer (remodeled based on IPSiO GXe 5500 manufactured by RICOH Co., Ltd.) having a heating fan was loaded with the manufactured ink and a solid image was printed on a white vinyl chloride sheet (IJ5331, manufactured by Sumitomo 3M Ltd.), the image was dried at 60° C. by the heating fan to form an image. Thereafter, filter paper was pressed against the solid portion. The drying property of the ink was evaluated based on the state of transfer of the ink to the filter paper according to the following criteria:

A: No transfer of ink to filter paper stops on drying condition of 60° C. for 15 minutes
B: No transfer of ink to filter paper stops on drying condition of 60° C. for 30 minutes
C: No transfer of ink to filter paper stops on drying condition of 60° C. for 60 minutes
D: Transfer of ink to filter paper continues after drying at 60° C. for 60 minutes Evaluation of Image Gloss After an inkjet printer (remodeled based on IPSiO GXe 5500 manufactured by RICOH Co., Ltd.) having a heating fan was loaded with the manufactured ink and a solid image was printed on a white vinyl chloride sheet (IJ5331, manufactured by Sumitomo 3M Ltd.), the image was dried at 60° C. by the heating fan to form an image. Thereafter, gloss at 60° of the solid image portion was measured by a gloss meter (4501, manufactured by BYK Gardener) and evaluated according to the following criteria.

A: Gloss at 60° 100% or greater
B: Gloss at 60° from 81% to less than 100%
C: Gloss at 60° from 60% to 80%
D: Gloss at 60° less than 60%

Evaluation on Scratch Resistance

After an inkjet printer (remodeled based on IPSiO GXe 5500 manufactured by RICOH Co., Ltd.) having a heating fan was loaded with the manufactured ink and a solid image was printed on a white vinyl chloride sheet (IJ5331, manufactured by Sumitomo 3M Ltd.), the image was dried at 60° C. by the heating fan to form an image. Thereafter, the solid portion was abraded by dried cotton (unbleached muslin No. 3) with a load of 400 g and evaluated about scratch (friction) resistance according to the following criteria:

A: No change in image when abraded 50+ times
B: Slight scratch observed when abraded 50 times but causing no damage to image density in terms of practical use
C: Image density degraded when abraded 21 times to 50 times
D: Image density degraded when abraded 20-times Evaluation on Ethanol Resistance After an inkjet printer (remodeled based on IPSiO GXe 5500 manufactured by RICOH Co., Ltd.) having a heating fan was loaded with the manufactured ink and a solid image was printed on a white vinyl chloride sheet (IJ5331, manufactured by Sumitomo 3M Ltd.), the image was dried at 60° C. by the heating fan to form an image. The solid image portion was abraded by a cotton applicator impregnated in 50% aqueous solution of ethanol. Ethanol resistance was evaluated by the degree of peeling of the film of the solid image portion according to the following criteria.

A: No peeling-off in solid image portion, no contamination on cotton applicator
B: No peeling-off in solid image portion but slight contamination on cotton applicator
C: Ink melted portion observed on solid image portion
D: Ink on solid image portion peeled and at least one portion of PVC film exposed Evaluation on Light Fastness After an inkjet printer (remodeled based on IPSiO GXe 5500 manufactured by RICOH Co., Ltd.) having a heating fan was loaded with the manufactured ink and a solid image was printed on a white vinyl chloride sheet (IJ5331, manufactured by Sumitomo 3M Ltd.), the image was dried at 60° C. by the heating fan to form an image. Each of the thus-obtained image samples was subject to an exposure test until the light exposure reached 2,600 kJ/m² by using a Xenon Weather-Ometer® (manufactured by Atlas Electrical Devices Co.,) on the condition that the outside filter and the inside filter used were TYPE S borosilicate glass while the black panel temperature was set to 89° C. and 50% RH. Discoloration before and after the test was measured by X-Rite 938 (manufactured by X-Rite Co.) and the light fastness was obtained by the following relation to evaluate the light fastness (color difference ΔExab) according to the following criteria.

$$\Delta Exab = (\Delta L \times 2 + \Delta a \times 2 + \Delta b \times 2)^{1/2}$$

A: ΔExab≤5
B: 5<ΔExab≤10
C: 10<ΔExab≤20
D: 20<ΔExab

Scratch Resistance

Thereafter, the solid image portion after the light fastness test was abraded by dried cotton (unbleached muslin No. 3) with a load of 400 g to evaluate light fastness scratch (friction) resistance according to the following criteria:
A: No change in image when abraded 50+ times
B: Slight scratch observed when abraded 50 times but causing no damage to image density in terms of practical use
C: Image density degraded when abraded 21 times to 50 times
D: Image density degraded when abraded 20-times Example 2

The ink of Example 2 was manufactured in the same manner as in Example 1 except that 20 parts of propylene glycol (boiling point: 188° C.) was changed to 25 parts of 2,3-butane diol and 38.4 part of deionized water was changed to 33.4 parts. The thus-obtained ink was evaluated in the same manner as in Example 1.

Example 3

The ink of Example 3 was manufactured in the same manner as in Example 2 except that 15 parts of the liquid dispersion of monoazo yellow pigment containing polymer was changed to 48 parts and 33.4 part of deionized water was changed to 0.4 parts. The thus-obtained ink was evaluated in the same manner as in Example 1.

Example 4

The ink of Example 4 was manufactured in the same manner as in Example 2 except that 7.5 parts of the polycarbonate-based urethane resin emulsion A was changed to 0.3 parts and 33.4 part of deionized water was changed to 40.6 parts. The thus-obtained ink was evaluated in the same manner as in Example 1.

Example 5

The ink of Example 5 was manufactured in the same manner as in Example 2 except that 7.5 parts of the polycarbonate-based urethane resin emulsion A was changed to 12 parts and 33.4 part of deionized water was changed to 28.9 parts. The thus-obtained ink was evaluated in the same manner as in Example 1.

Example 6

The ink of Example 6 was manufactured in the same manner as in Example 2 except that 7.5 parts of the polycarbonate-based urethane resin emulsion A was changed to 7.5 parts of the polycarbonate-based urethane resin emulsion B. The thus-obtained ink was evaluated in the same manner as in Example 1.

Example 7

The ink of Example 7 was manufactured in the same manner as in Example 2 except that 7.5 parts of the polycarbonate-based urethane resin emulsion A was changed to 5 parts and 2 parts of the acrylic-based resin emulsion was changed to 4.5 parts. The thus-obtained ink was evaluated in the same manner as in Example 1.

Example 8

The ink of Example 8 was manufactured in the same manner as in Example 2 except that 1 part of ultraviolet absorber (TINUVIN 479-DW, manufactured by BASF) was added and 33.4 parts of the deionized water was changed to 32.4 parts. The thus-obtained ink was evaluated in the same manner as in Example 1.

Example 9

The ink of Example 8 was manufactured in the same manner as in Example 2 except that 1 part of ultraviolet absorber (TINUVIN 477-DW, manufactured by BASF) was added and 33.4 parts of the deionized water was changed to 32.4 parts. The thus-obtained ink was evaluated in the same manner as in Example 1.

Example 10

Preparation of Silicone Surface Reformed Titanium Dioxide 10 parts of titanium dioxide (CR-60, manufactured by ISHIHARA SANGYO KAISHA, LTD.) dried at 110° C. for two days by a reduced pressure drier was charged into 200 mL flask equipped with a pressure equalizing dripping funnel followed by nitrogen replacement. A solution in which 0.5 parts of reactive silicone oil (KF-99, manufactured by Shin-Etsu Co., Ltd.) was diluted with 40 parts of dehydrated toluene was gradually dripped from the dripping funnel to the flask followed by stirring. After the completion of dripping, the resultant was heated in an oil bath followed by distilling away toluene. Thereafter, reaction was conducted at 150° C. for three hours. After completion of the reaction, solid portions were retrieved followed by washing with methanol sufficiently. The resultant was dried with a reduced pressure at 60° C. for one day to obtain silicone surface reformed titanium dioxide.

Preparation of Dispersion Element of Polymer Particle Containing White Pigment

The dispersion element of polymer particles containing white pigment was prepared in the same manner as in Example 1 except that the yellow pigment (C. I. Pigment Yellow 74, manufactured by Dainichiseika Color Chemicals Mfg. Co., Ltd.) was changed to 6 parts of the silicone surface treated titanium dioxide prepared as described above in the preparation of the dispersion element of polymer particles containing monoazo yellow pigment of Example 1.

The average particle diameter (D50) of the thus-obtained polymer particles was 280 nm as measured by a particle size distribution measuring instrument (NANOTRAC UPA-EX150, manufactured by NIKKISO CO., LTD.).

Next, a white ink was manufactured in the same manner as in Example 8 except that 15 parts of the liquid dispersion of polymer particles containing monoazo yellow pigment was changed to 15 parts of the liquid dispersion of polymer particles containing white pigment.

The thus-obtained white ink was applied to the entire surface of a transparent polyethylene terephthalate (E5100, manufactured by TOYOBO CO., LTD.) instead of the white vinyl chloride sheet (IJ5331) followed by drying at 60° C. by the heating fan for the same evaluation as in Example 1. Only the white ink was applied to the entire surface of a recording medium in each evaluation as described above. The evaluation was conducted with no solid image printed.

Example 11

The evaluation was made in the same manner as in Example 1 except that a solid image was printed with the ink manufactured in Example 2 after the white ink prepared in Example 10 was applied to the entire surface of a recording medium (transparent polyethylene terephthalate E5100, manufactured by TOYOBO CO., LTD.).

Example 12

The ink of Example 12 was manufactured in the same manner as in Example 8 except that 25 parts of 2,3-butane diol (boiling point: 183° C.) was changed to 25 parts of 1,2-butanediol (boiling point: 194° C.). The obtained ink was evaluated in the same manner as in Example 1.

Example 13

The ink of Example 13 was manufactured in the same manner as in Example 8 except that 25 parts of 2,3-butane diol (boiling point: 183° C.) was changed to 25 parts of 1,3-popanediol (boiling point: 214° C.). The thus-obtained ink was evaluated in the same manner as in Example 1.

Example 14

The ink of Example 14 was manufactured in the same manner as in Example 8 except that 25 parts of 2,3-butane diol (boiling point: 183° C.) was changed to 25 parts of 1,2-propanediol (boiling point: 187° C.). The thus-obtained ink was evaluated in the same manner as in Example 1.

Example 15

The ink of Example 15 was manufactured in the same manner as in Example 8 except that 25 parts of 2,3-butane diol (boiling point: 183° C.) was changed to 25 parts of 1,3-butanediol (boiling point: 203° C.). The thus-obtained ink was evaluated in the same manner as in Example 1.

Comparative Example 1

Preparation of Liquid Dispersion of Yellow Pigment Surfactant 30 parts of monoazo yellow pigment (C. I. Pigment Yellow 74, manufactured by Dainichiseika Color and Chemicals Mfg. Co., Ltd.), 10.0 parts of polyoxyethylene styrene phenylether (nonionic surfactant, NOIGEN EA177, HLB value: 15.7, manufactured by DAI-ICHI KOGYO SEIYAKU CO., LTD.), and 60.0 parts of deionized water were prepared.

The surfactant mentioned above was dissolved in the deionized water followed by mixing with the pigment mentioned above. Subsequent to sufficient moistening, the resultant was dispersed by a wet type dispersing device (DYNO-MILL KDL A type, manufactured by Willy A. Bachofen AG) which was filled with zirconia beads having a diameter of 0.5 mm at 2,000 rpm for two hours to obtain a primary pigment dispersion element.

Thereafter, 4.26 parts of hydrosoluble polyurethane resin (Takelac W-5661, manufactured by Mitsui Chemicals, Inc., effective component: 35.2% by weight, acid value: 40 mgKOH/g, molecular weight: 18,000) was added followed by sufficient stirring to obtain a liquid dispersion of yellow pigment surfactant. The average particle diameter (D50) of the pigment dispersion element in the thus-obtained liquid dispersion of yellow pigment was 62 nm.

Using the liquid dispersion of pigment, the following recipe was mixed and stirred and thereafter filtrated by a polypropylene filter of 0.2 µm to manufacture an ink.

The ink of Comparative Example 1 was manufactured in the same manner as in Example 1 except that the dispersion element of polymer particles containing monoazo yellow pigment was changed to the pigment dispersion element mentioned above: The thus-obtained ink was evaluated in the same manner as in Example 1.

Comparative Example 2

The ink of Comparative Example 2 was manufactured in the same manner as in Example 1 except that no polycarbonate-based urethane resin emulsion A was added and 38.4 parts of deionized water was changed to 45.9 parts. The obtained ink was evaluated in the same manner as in Example 1.

Comparative Example 3

Using the ink of Example 1, a solid image was printed and not dried 60° C. by the heating fan after a solid image was printed. The image was dried one night by leaving as was at 25° C. and thereafter evaluated in the same manner as in Example 1.

Comparative Example 4

The ink of Comparative Example 4 was manufactured in the same manner as in Example 8 except that 25 parts of 2,3-butane diol (boiling point: 183° C.) was changed to 25 parts of glycerin (boiling point: 290° C.). The thus-obtained ink was evaluated in the same manner as in Example 1.

Comparative Example 5

Preparation of Liquid Dispersion of White Pigment 11.4 parts of deionized water, 12 parts of 3-methyl-1,3-butane diol, 0.6 parts of DISPERBYK-190 (manufactured by Byk Chemie Japan Co., Ltd.) serving as dispersant were placed in a vial container followed by light stirring for unification. Thereafter, 6 parts of the silicone surface reformed titanium dioxide prepared as described above was added thereto followed by irradiation (600 W) with ultrasonic wave at 50° C. for three hours to obtain a liquid dispersion. This liquid dispersion was gradually cooled down to room temperature to prepare a liquid dispersion of white pigment. The volume average particle diameter (D50) of the thus-obtained liquid dispersion of white pigment measured by a particle size distribution measuring instrument (NANOTRAC UPA-EX150, manufactured by NIK-KISO CO., LTD.) was 231 nm.

Next, an ink was manufactured in the same manner as in Example 8 except that 15 parts of the liquid dispersion of polymer particles containing monoazo yellow pigment was changed to 15 parts of the liquid dispersion of white pigment prepared as described above.

The thus-obtained white ink was applied to the entire surface of a transparent polyethylene terephthalate (E5100, manufactured by TOYOBO CO., LTD.) instead of the white vinyl chloride sheet (IJ5331) followed by drying at 60° C. by the heating fan for the same evaluation as in Example 1. Only the white ink was applied to the entire surface of a recording medium in each evaluation as described above. The evaluation was conducted with no solid image printed.

TABLE 1

|  |  | Example 1 | Example 2 | Example 3 | Example 4 |
|---|---|---|---|---|---|
| Water |  Deionized water | 38.4 | 33.4 | 0.4 | 40.6 |
| Hydrosoluble organic solvent | propylene glycol (bp 188° C.) | 20 |  |  |  |
|  | 2,3-butane diol (bp183° C.) |  | 25 | 25 | 25 |
|  | 1,2-butane diol (bp 194° C.) |  |  |  |  |
|  | 1,3-propane diol (bp 214° C.) |  |  |  |  |
|  | 1,2-propane diol (bp 187° C.) |  |  |  |  |
|  | 1,3-butane diol (bp 203° C.) |  |  |  |  |
|  | Diethylene glycol n-butyl ether (bp 230° C.) | 15 | 15 | 15 | 15 |
|  | Glycerin (bp 290° C.) |  |  |  |  |
| Water dispersible resin | Polycarbonate-based urethane resin Emulsion A | 7.5 | 7.5 | 7.5 | 0.3 |
|  | Acrylic-based resin emulsion (R-3380-E) | 2 | 2 | 2 | 2 |
|  | Polycarbonate-based urethane resin Emulsion B |  |  |  |  |
| Ultraviolet absorber | TINUVIN 479-DW |  |  |  |  |
|  | TINUVIN 477-DW |  |  |  |  |
| Liquid dispersion of pigment | Liquid dispersion of yellow pigment surfactant |  |  |  |  |
|  | Liquid dispersion of yellow pigment containing polymer particle | 15 | 15 | 48 | 15 |
|  | Liquid dispersion of white pigment containing polymer particle |  |  |  |  |
|  | Liquid dispersion of white pigment surfactant |  |  |  |  |
| Surfactant | $CH_3(CH_2)_{12}O(CH_2CH_2O)_3CH_2COOH$ | 2 | 2 | 2 | 2 |
| Preservatives and fungicide | Proxel LV | 0.1 | 0.1 | 0.1 | 0.1 |
|  | Total of ink | 100 | 100 | 100 | 100 |
| Recording medium |  | White vinyl chloride | White vinyl chloride | White vinyl chloride | White vinyl chloride |
| Ink attachment area |  | Image portion | Image portion | Image portion | Image portion |
| Drying property |  | A | A | A | A |
| Gloss |  | B | A | A | B |
| Scratch resistance |  | A | A | B | B |
| Ethanol resistance |  | A | A | B | A |
| Light fastness |  | B | B | A | B |
| Light fastness (after test) friction resistance |  | B | B | B | B |

|  |  | Example 5 | Example 6 | Example 7 | Example 8 |
|---|---|---|---|---|---|
| Water | Deionized water | 28.9 | 33.4 | 33.4 | 32.4 |
| Hydrosoluble organic solvent | propylene glycol (bp 188° C.) |  |  |  |  |
|  | 2,3-butane diol (bp183° C.) | 25 | 25 | 25 | 25 |
|  | 1,2-butane diol (bp 194° C.) |  |  |  |  |
|  | 1,3-propane diol (bp 214° C.) |  |  |  |  |
|  | 1,2-propane diol (bp 187° C.) |  |  |  |  |
|  | 1,3-butane diol (bp 203° C.) |  |  |  |  |
|  | Diethylene glycol n-butyl ether (bp 230° C.) | 15 | 15 | 15 | 15 |
|  | Glycerin (bp 290° C.) |  |  |  |  |
| Water dispersible resin | Polycarbonate-based urethane resin Emulsion A | 12 |  | 5 | 7.5 |
|  | Acrylic-based resin emulsion (R-3380-E) | 2 | 2 | 4.5 | 2 |
|  | Polycarbonate-based urethane resin Emulsion B |  | 7.5 |  |  |
| Ultraviolet absorber | TINUVIN 479-DW |  |  |  |  |
|  | TINUVIN 477-DW |  |  |  | 1 |
| Liquid dispersion of pigment | Liquid dispersion of yellow pigment surfactant |  |  |  |  |
|  | Liquid dispersion of yellow pigment containing polymer particle | 15 | 15 | 15 | 15 |
|  | Liquid dispersion of white pigment containing polymer particle |  |  |  |  |
|  | Liquid dispersion of white pigment surfactant |  |  |  |  |

TABLE 1-continued

| | | | | | |
|---|---|---|---|---|---|
| Surfactant | CH₃(CH₂)₁₂O(CH₂CH₂O)₃CH₂COOH | 2 | 2 | 2 | 2 |
| Preservatives and fungicide | Proxel LV | 0.1 | 0.1 | 0.1 | 0.1 |
| | Total of ink | 100 | 100 | 100 | 100 |
| Recording medium | | White vinyl chloride | White vinyl chloride | White vinyl chloride | White vinyl chloride |
| Ink attachment area | | Image portion | Image portion | Image portion | Image portion |
| Drying property | | B | A | A | A |
| Gloss | | A | A | A | A |
| Scratch resistance | | A | A | B | A |
| Ethanol resistance | | A | A | B | A |
| Light fastness | | B | B | B | A |
| Light fastness (after test) friction resistance | | B | B | B | A |

| | | Example 9 | Example 10 | Example 11 | Example 12 |
|---|---|---|---|---|---|
| Water | Deionized water | 32.4 | 32.4 | 33.4 | 32.4 |
| Hydrosoluble organic solvent | propylene glycol (bp 188° C.) | | | | |
| | 2,3-butane diol (bp 183° C.) | 25 | 25 | 25 | |
| | 1,2-butane diol (bp 194° C.) | | | | 25 |
| | 1,3-propane diol (bp 214° C.) | | | | |
| | 1,2-propane diol (bp 187° C.) | | | | |
| | 1,3-butane diol (bp 203° C.) | | | | |
| | Diethylene glycol n-butyl ether (bp 230° C.) | 15 | 15 | 15 | 15 |
| | Glycerin (bp 290° C.) | | | | |
| Water dispersible resin | Polycarbonate-based urethane resin Emulsion A | 7.5 | 7.5 | 7.5 | 7.5 |
| | Acrylic-based resin emulsion (R-3380-E) | 2 | 2 | 2 | 2 |
| | Polycarbonate-based urethane resin Emulsion B | | | | |
| Ultraviolet absorber | TINUVIN 479-DW | | 1 | | 1 |
| | TINUVIN 477-DW | 1 | | | |
| Liquid dispersion of pigment | Liquid dispersion of yellow pigment surfactant | | | | |
| | Liquid dispersion of yellow pigment containing polymer particle | 15 | | 15 | 15 |
| | Liquid dispersion of white pigment containing polymer particle | | 15 | | |
| | Liquid dispersion of white pigment surfactant | | | | |
| Surfactant | CH₃(CH₂)₁₂O(CH₂CH₂O)₃CH₂COOH | 2 | 2 | 2 | 2 |
| Preservatives and fungicide | Proxel LV | 0.1 | 0.1 | 0.1 | 0.1 |
| | Total of ink | 100 | 100 | 100 | 100 |
| Recording medium | | White vinyl chloride | Transparent PET (E5100: TOYOBO) | Transparent PET (After white ink applied entirely) | White vinyl chloride |
| Ink attachment area | | Image portion | Entire surface | Image portion | Image portion |
| Drying property | | A | A | A | A |
| Gloss | | A | A | A | A |
| Scratch resistance | | A | A | A | A |
| Ethanol resistance | | A | A | A | A |
| Light fastness | | A | A | A | A |
| Light fastness (after test) friction resistance | | A | A | A | A |

TABLE 1-continued

|  |  | Example 13 | Example 14 | Example 15 | Comparative Example 1 |
|---|---|---|---|---|---|
| Water | Deionized water | 32.4 | 32.4 | 32.4 | 38.4 |
| Hydrosoluble organic solvent | propylene glycol (bp 188° C.) |  |  |  | 20 |
|  | 2,3-butane diol (bp183° C.) |  |  |  |  |
|  | 1,2-butane diol (bp 194° C.) |  |  |  |  |
|  | 1,3-propane diol (bp 214° C.) | 25 |  |  |  |
|  | 1,2-propane diol (bp 187° C.) |  | 25 |  |  |
|  | 1,3-butane diol (bp 203° C.) |  |  | 25 |  |
|  | Diethylene glycol n-butyl ether (bp 230° C.) | 15 | 15 | 15 | 15 |
|  | Glycerin (bp 290° C.) |  |  |  |  |
| Water dispersible resin | Polycarbonate-based urethane resin Emulsion A | 7.5 | 7.5 | 7.5 | 7.5 |
|  | Acrylic-based resin emulsion (R-3380-E) | 2 | 2 | 2 | 2 |
|  | Polycarbonate-based urethane resin Emulsion B |  |  |  |  |
| Ultraviolet absorber | TINUVIN 479-DW | 1 | 1 | 1 |  |
|  | TINUVIN 477-DW |  |  |  |  |
| Liquid dispersion of pigment | Liquid dispersion of yellow pigment surfactant |  |  |  | 15 |
|  | Liquid dispersion of yellow pigment containing polymer particle | 15 | 15 | 15 |  |
|  | Liquid dispersion of white pigment containing polymer particle |  |  |  |  |
|  | Liquid dispersion of white pigment surfactant |  |  |  |  |
| Surfactant | $CH_3(CH_2)_{12}O(CH_2CH_2O)_3CH_2COOH$ | 2 | 2 | 2 | 2 |
| Preservatives and fungicide | Proxel LV | 0.1 | 0.1 | 0.1 | 0.1 |
|  | Total of ink | 100 | 100 | 100 | 100 |
| Recording medium |  | White vinyl chloride | White vinyl chloride | White vinyl chloride | White vinyl chloride |
| Ink attachment area |  | Image portion | Image portion | Image portion | Image portion |
| Drying property |  | A | A | A | B |
| Gloss |  | A | A | A | C |
| Scratch resistance |  | A | A | A | B |
| Ethanol resistance |  | A | A | A | B |
| Light fastness |  | A | A | A | D |
| Light fastness (after test) friction resistance |  | A | A | A | D |

|  |  | Comparative Example 2 | Comparative Example 3 | Comparative Example 4 | Comparative Example 5 |
|---|---|---|---|---|---|
| Water | Deionized water | 45.9 | 38.4 | 32.4 | 32.4 |
| Hydrosoluble organic solvent | propylene glycol (bp 188° C.) | 20 | 20 |  |  |
|  | 2,3-butane diol (bp183° C.) |  |  |  | 25 |
|  | 1,2-butane diol (bp 194° C.) |  |  |  |  |
|  | 1,3-propane diol (bp 214° C.) |  |  |  |  |
|  | 1,2-propane diol (bp 187° C.) |  |  |  |  |
|  | 1,3-butane diol (bp 203° C.) |  |  |  |  |
|  | Diethylene glycol n-butyl ether (bp 230° C.) | 15 | 15 | 15 | 15 |
|  | Glycerin (bp 290° C.) |  |  | 25 |  |
| Water dispersible resin | Polycarbonate-based urethane resin Emulsion A |  | 7.5 | 7.5 | 7.5 |
|  | Acrylic-based resin emulsion (R-3380-E) | 2 | 2 | 2 | 2 |
|  | Polycarbonate-based urethane resin Emulsion B |  |  |  |  |
| Ultraviolet absorber | TINUVIN 479-DW |  |  | 1 | 1 |
|  | TINUVIN 477-DW |  |  |  |  |
| Liquid dispersion of pigment | Liquid dispersion of yellow pigment surfactant |  |  |  |  |
|  | Liquid dispersion of yellow pigment containing polymer particle | 15 | 15 | 15 |  |
|  | Liquid dispersion of white pigment containing polymer particle |  |  |  |  |
|  | Liquid dispersion of white pigment surfactant |  |  |  | 15 |

TABLE 1-continued

| | | | | | |
|---|---|---|---|---|---|
| Surfactant | $CH_3(CH_2)_{12}O(CH_2CH_2O)_3CH_2COOH$ | 2 | 2 | 2 | 2 |
| Preservatives and fungicide | Proxel LV | 0.1 | 0.1 | 0.1 | 0.1 |
| | Total of ink | 100 | 100 | 100 | 100 |
| Recording medium | | White vinyl chloride | White vinyl chloride | White vinyl chloride | Transparent PET (E5100: TOYOBO) |
| Ink attachment area | | Image portion | Image portion | Image portion | Entire |
| Drying property | | B | D | D | A |
| Gloss | | D | C | C | B |
| Scratch resistance | | D | D | D | C |
| Ethanol resistance | | D | D | D | C |
| Light fastness | | B | B | B | B |
| Light fastness (after test) friction resistance | | D | D | D | D |

According to the present invention, an ink is provided which has good drying property and image portions of the ink have high level of gloss, scratch resistance, and ethanol resistance even when the image is printed on a non-porous substrate.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet recording method comprising:
    printing an image on a recording medium by thermal or mechanical energy action on an aqueous ink for inkjet, to obtain recorded matter; and
    heating the recorded matter formed by the aqueous ink, at a temperature from 40° C. to 120° C.,
    wherein the aqueous ink comprises:
        water;
        at least one hydrosoluble organic solvent each having a boiling point of 250° C. or lower;
        vinyl polymer particles comprising a pigment; and
        polycarbonate-based urethane resin particles.

2. The inkjet recording method according to claim 1, further comprising coating an entire surface of the recording medium with the aqueous ink for inkjet comprising a white pigment; and applying the aqueous ink for inkjet comprising a non-white pigment to the recording medium.

3. The inkjet recording method according to claim 1, wherein the recording medium is formed of a non-porous material.

4. The inkjet recording method according to claim 1, wherein the ink includes an ultraviolet absorber.

5. The inkjet recording method according to claim 1, wherein the hydrosoluble organic solvent includes at least one of 1,2-propane diol, 1,3-propane diol, 1,2-butane diol, 1,3-butane diol, and 2,3-butane diol.

6. The inkjet recording method according to claim 1, wherein an average particle diameter of the polycarbonate-based urethane resin particles is 10 to 350 nm.

7. The inkjet recording method according to claim 1, wherein the polycarbonate-based urethane resin particles includes an anionic group within an acid value range of from 20-100 mgKOH/g.

8. The inkjet recording method according to claim 1, wherein the polycarbonate-based urethane resin particles account for 0.5 to 10 percent by mass of the ink.

9. The inkjet recording method according to claim 4, wherein the ultraviolet absorber includes a triadine-based ultraviolet absorber.

10. The inkjet recording method according to claim 4, wherein a content of the ultraviolet absorber in the ink is 0.5 to 20% by weight.

* * * * *

UNITED STATES PATENT AND TRADEMARK OFFICE
CERTIFICATE OF CORRECTION

PATENT NO. : 9,587,124 B2  
APPLICATION NO. : 14/589131  
DATED : March 7, 2017  
INVENTOR(S) : Hidefumi Nagashima et al.

Page 1 of 1

It is certified that error appears in the above-identified patent and that said Letters Patent is hereby corrected as shown below:

On the Title Page

Add the following item (30) [Foreign Application Priority Data]:

--(30) Foreign Application Priority Data:  
Jan. 9, 2014     [JP] ........................ 2014-002501  
May 20, 2014   [JP] ........................ 2014-104438--.

Signed and Sealed this  
Sixteenth Day of May, 2017

Michelle K. Lee  
*Director of the United States Patent and Trademark Office*